US00RE44052E

(19) United States
(12) Reissued Patent
Kim et al.

(10) Patent Number: US RE44,052 E
(45) Date of Reissued Patent: Mar. 5, 2013

(54) FLASH MEMORY MANAGEMENT METHOD

(75) Inventors: Bum-Soo Kim, Gyeonggi-Do (KR); Gui-Yong Lee, Yongin-Si (KR); Jong-Min Kim, Yongin-Si (KR); Ji-hyun In, Gyeonggi-do (KR); Jesung Kim, Newton, MA (US); Sam-hyuk Noh, Seoul (KR); Sang-Iyul Min, Seoul (KR); Dong-hee Lee, Seoul (KR); Jae-yong Jeong, Suwon (KR); Yoo-kun Cho, Seoul (KR); Jong-moo Choi, Yongin (KR)

(73) Assignee: Samsung Electronics Co., Ltd., Samsung-ro, Yeongtung-gu, Suwon-si, Gyeonggi-do (KR)

(21) Appl. No.: 11/848,005

(22) Filed: Aug. 30, 2007

Related U.S. Patent Documents

Reissue of:
(64) Patent No.: 6,938,116
Issued: Aug. 30, 2005
Appl. No.: 10/029,966
Filed: Dec. 31, 2001

(30) Foreign Application Priority Data

Jun. 4, 2001 (KR) ..... 2001-31124

(51) Int. Cl.
*G06F 12/00* (2006.01)

(52) U.S. Cl. ..... 711/103; 711/159; 711/161; 711/170

(58) Field of Classification Search ..... 711/103, 711/159, 161, 170
See application file for complete search history.

(56) References Cited

U.S. PATENT DOCUMENTS

| | | | | |
|---|---|---|---|---|
| 5,266,133 | A | 11/1993 | Taylor et al. | |
| 5,388,083 | A | 2/1995 | Assar et al. | |
| 5,404,485 | A | 4/1995 | Ban | |
| 5,479,638 | A | 12/1995 | Assar et al. | |
| 5,485,595 | A | 1/1996 | Assar et al. | |
| 5,528,764 | A | 6/1996 | Heil | |
| 5,530,828 | A * | 6/1996 | Kaki et al. | 711/103 |
| 5,696,929 | A | 12/1997 | Hasburn et al. | |
| 5,717,886 | A | 2/1998 | Miyauchi | |
| 5,745,418 | A | 4/1998 | Ma et al. | |
| 5,778,427 | A | 7/1998 | Hagersten et al. | |

(Continued)

FOREIGN PATENT DOCUMENTS

| | | | |
|---|---|---|---|
| JP | 05-241741 | A | 9/1993 |
| JP | 05-282889 | A | 10/1993 |

(Continued)

OTHER PUBLICATIONS

Jim Handy, The Cache Memory Book, Academic Press, 1993, pp. 1-107 and 240-269.*

*Primary Examiner* — Hong Kim
(74) *Attorney, Agent, or Firm* — Muir Patent Consulting, PLLC

(57) ABSTRACT

A flash memory management method is provided. According to the method, when a request to write the predetermined data to a page to which data has been written is made, the predetermined data is written to a log block corresponding to a data block containing the page. When a request to write the predetermined data to the page again is received, the predetermined data is written to an empty free page in the log block. Even if the same page is requested to be continuously written to, the management method allows this to be processed in one log block, thereby improving the effectiveness in the use of flash memory resources.

20 Claims, 12 Drawing Sheets

U.S. PATENT DOCUMENTS

| | | | | |
|---|---|---|---|---|
| 5,802,554 | A * | 9/1998 | Caceres et al. | 711/103 |
| 5,845,313 | A | 12/1998 | Estakhri et al. | |
| 5,860,083 | A * | 1/1999 | Sukegawa | 711/103 |
| 5,933,368 | A | 8/1999 | Ma et al. | |
| 5,937,425 | A | 8/1999 | Ban | |
| 5,956,473 | A | 9/1999 | Ma et al. | |
| 5,999,446 | A * | 12/1999 | Harari et al. | 365/185.03 |
| 6,000,006 | A | 12/1999 | Bruce et al. | |
| 6,263,398 | B1 * | 7/2001 | Taylor et al. | 711/3 |
| 6,298,428 | B1 | 10/2001 | Munroe et al. | |
| 6,327,639 | B1 | 12/2001 | Asnaashari | |
| 6,418,506 | B1 * | 7/2002 | Pashley et al. | 711/103 |
| 6,564,286 | B2 * | 5/2003 | DaCosta | 711/103 |
| 6,587,915 | B1 | 7/2003 | Kim | |
| 6,704,835 | B1 * | 3/2004 | Garner | 711/103 |
| 6,760,805 | B2 | 7/2004 | Lasser | |
| 6,836,816 | B2 * | 12/2004 | Kendall | 711/3 |
| 2001/0040827 | A1 * | 11/2001 | Dosaka et al. | 365/189.01 |
| 2002/0002652 | A1 | 1/2002 | Takahashi | |
| 2002/0144059 | A1 | 10/2002 | Kendall | |
| 2002/0166022 | A1 | 11/2002 | Suzuki | |
| 2005/0144358 | A1 * | 6/2005 | Conley et al. | 711/103 |

FOREIGN PATENT DOCUMENTS

| | | | |
|---|---|---|---|
| JP | 07-154870 | A | 6/1995 |
| JP | 09-097205 | A | 4/1997 |
| JP | 10-040175 | A | 2/1998 |
| JP | 2001-521220 | A | 11/2001 |
| WO | WO 99/21093 | A1 | 4/1999 |

* cited by examiner

FLASH MEMORY MANAGEMENT METHOD

Matter enclosed in heavy brackets [ ] appears in the original patent but forms no part of this reissue specification; matter printed in italics indicates the additions made by reissue.

*This is a reissue application of U.S. application Ser. No. 10/029,966, now U.S. Pat. No. 6,938,116, filed Dec. 31, 2001, the entire contents of which are hereby incorporated by reference.*

BACKGROUND OF THE INVENTION

1. Field of the Invention

The present invention relates to a flash memory, and more particularly, to a flash memory management method for use in a flash memory-based system. The present application is based on Korean Patent Application No. 2001-31124 filed Jun. 4, 2001.

2. Description of the Related Art

Flash memories are a special type of a nonvolatile memory capable of electrically erasing and programming data. Flash memory based storage devices have low power consumption and small size compared to magnetic disc memory based devices. Thus, since flash memories can be substituted for magnetic disk memories, much research and development is actively in progress. Flash memories are expected to receive considerable attention as storage devices for mobile computing devices such as digital cameras, mobile phones, or personal digital assistants (PDAs).

In magnetic disc drives, new data can be written over previous old data. However, in flash memories, a block needs to be erased before it is rewritten with new data; that is, memory cells are returned to an original state in which data can be written. This operation is called "erase". An erase operation typically requires much more time than a write operation. Furthermore, since the erase operation is performed in blocks whose size is much larger than what the write operation requires, even a portion requested not to be written to may be erased. In this case, the unnecessarily erased portion needs to be reclaimed through a write operation. In the worst scenario, a request to write (overwrite) data requires one erase operation and write operations to recover the portion erased by the erase operation. Due to inconsistency between units on which erase and write commands are executed, write performance is significantly lower than read performance. Furthermore, the write performance of a flash memory is lower than that of a magnetic disc based storage device that inevitably involves a delay due to mechanical operation. Thus, improving write performance is essential in designing a flash memory based device.

U.S. Pat. No. 5,388,083 proposes a content addressable memory (CAM) system for converting a logical address requested by a user to a physical address in a flash memory while avoiding an erase cycle by writing altered data into an empty block in order to prevent a delay due to erase-before-write. However, implementation of the CAM system requires additional costly circuits. U.S. Pat. No. 5,485,595 proposes an approach which involves writing a logical address into an extra region of each page and sequentially comparing each of the logical addresses while avoiding an erase cycle by writing altered data into an empty space upon a write request. However, if a unit of read operation is large like in a NAND-type flash memory, the address conversion mechanism requires a large amount of time in reading address conversion information scattered around the flash memory, thereby degrading system performance.

U.S. Pat. No. 5,845,313 proposes a flash memory storage architecture in which a linear address conversion table for performing a direct address conversion is constructed in a special RAM by scanning a logical address stored in a flash memory during a system reset. However, a RAM of a large storage capacity is required to store the address conversion table. For example, to store an address conversion table of a flash memory based storage device having a storage capacity of 32 MB and a page size of 512 bytes, 128 KB of RAM is required assuming that 2 bytes are provided for each of 65,536 pages. The storage capacity is too large for a small-scale system having few resources such as mobile equipment.

U.S. Pat. No. 5,404,485 proposes an approach for allocating a new block (replacement block) for write operation and writing data to the allocated block. However, since a new block continues to be allocated for write operation, a plurality of different versions of blocks to which the same page is written exist. That is, at least one replacement block needs to be provided for every block, thereby significantly reducing the capacity of a flash memory. A page to be written to a new block must be written at the same position as the position at which the page was written to the previous block. When the page is frequently updated but the remaining pages are rarely updated, only the content of the specific page is changed while the remaining pages contain a plurality of the same replacement blocks, thereby wasting a lot of storage space in a flash memory. Thus, this approach is not suitable for small-scale systems such as mobile equipment.

SUMMARY OF THE INVENTION

To solve the above problems, it is an object of the present invention to provide a flash memory based system and management method therefor capable of improving the performance of a flash memory.

It is another object of the present invention to provide a flash memory based system and management method therefor, which allow for consistent data recovery in an emergency such as power cut-off.

It is still another object of the present invention to provide a flash memory based system and management method therefor, which prevent degradation of system performance in an environment where data updates to a specific page are frequently made such as a DOS file system based on a file allocation table (FAT).

Accordingly, to achieve the above objects, the present invention provides a method for writing predetermined data to a flash memory. The method includes the steps of: (a) receiving a request to write the predetermined data to a page to which data has been written; (b) writing the predetermined data to a log block corresponding to a data block containing the page; (c) receiving a request to write the predetermined data to the page again; and (d) writing the predetermined data to an empty free page in the log block.

Preferably, step (b) may include the step (b11) of writing the predetermined data to an empty free page or the steps of (b21) allocating the log block; and (b22) writing the predetermined data to an empty page at the same position as the requested page in the data block.

In another embodiment, a method for writing predetermined data to a flash memory includes the steps of: (a) receiving a request to write the predetermined data to a page; (b) allocating a log block 1-1 corresponding to a first data block containing the page; (c) writing the predetermined data to an empty page in the log block 1-1; (d) receiving a request to write the predetermined data to the page again; and (e) writing the predetermined data to an empty free page in the log block 1-1.

Preferably, step (b) comprises the steps of: (b1) performing a block merge to create a third data block based on a second data block and a second log block corresponding to the second data block; and (b2) allocating a free block obtained by performing an erase operation on the second data block as the log block 1-1.

Preferably, step (b1) is performed when a free block to be allocated as the log block 1-1 does not exist or when all pages of the existing log block corresponding to the first data block have been used.

More preferably, step (b1) may include the step of (b11) performing a switch merge to change the second log block to the third data block when pages of the second log block are arranged in the same order that pages of the second data block are arranged, and the pages of the second log block correspond one-to-one to the pages of the second data block. Step (b1) may include the step of (b12) performing a copy merge to copy corresponding pages of the second data block to free pages in the second log block and create the third data block when the pages in the second log block are requested to be written only once. Step (b1) may include the step of (13) performing a simple merge to copy the latest pages in the second log block to free pages of a free block to which data has not been written and copy a corresponding page of the second data block to the remaining free pages thereof, thereby creating the third data block.

Most preferably, step (e) includes the steps of: (e1) allocating a new log block 1-2 if a free page does not exist in the log block 1-1; and (e2) writing the predetermined data to a free page in the log block 1-2. Step (e1) may include the steps of: (e11) performing a switch merge to change the log block to a second data block when pages of the log block 1-1 are arranged in the order in which pages of the first data block are arranged and the pages of the log block 1-1 correspond one-to-one to the pages of the first data block, and (e12) allocating a free block obtained by performing an erase operation on the first data block as the log block 1-2. Step (e1) may include the steps of (e21) performing a copy merge to copy corresponding pages in the first data block to a free page in the log block 1-1 when pages in the log block 1-1 are requested to be written only once; and (e22) allocating a free block obtained by performing an erase operation on the first data block as the log block 1-2. Step (e1) may include the steps of: (e31) performing a simple merge to copy the latest pages in the log block 1-1 to free pages of a free block and copy a corresponding page of the first data block to the remaining free pages thereof, thereby creating a second data block; and (e32) allocating a free block obtained by performing an erase operation on the first data block or the log block 1-1 as the log block 1-2.

Preferably, step (e2) may include the step of (e21) writing the predetermined data to a free page at the same position as the requested page in the data block.

The present invention also provides a method for reading predetermined data from a flash memory. The method includes the steps of: (a) searching a log pointer table for an entry in which a block address portion of a logical address of a requested page is recorded; (b) checking whether the logical address of the requested page exists in the found entry; and (c) referring to a physical address of a corresponding log block recorded in the found entry and a position at which the logical address of the requested page is written to the found entry and accessing a corresponding page of the log block. Preferably, in step (c), the corresponding page in the log block is accessed at the same position as the position to which the logical address of the requested page is written to the found entry.

The present invention also provides a method for managing a flash memory including a data block and a log block for writing data for updating the data block. The method includes the steps of (a) when pages of a first data block are arranged in the same order in which pages of a first log block corresponding to the first data block are arranged and all the pages of the first data block map one-to-one with the pages of the first log block, changing the first log block to a second data block; and (b) updating address conversion information.

In another embodiment, a method for managing a flash memory including a data block and a log block for writing data for updating the data blocks includes the steps of: (a) when pages in a first log block are requested to be written only once, copying a corresponding page of a first data block to a free page of the first log block in order to create a second data block; and (b) updating address conversion information.

In another embodiment, a method for managing a flash memory including a data block and a log block for writing data for updating the data block includes the steps of: (a) copying the latest pages in a first log block to a free block to which data has not been written and copying a corresponding page of a first data block corresponding to the first log block to a remaining free page to create a second data block; and (b) updating address conversion information.

Preferably, prior to step (a), the flash memory management method further includes the step of (a0) writing recovery information for recovering data in the event of a system failure during the step (a) or (b).

Preferably, the flash memory management method further includes the step of (c) recovering data referring to the recovery information in the event of a system failure during the step (a) or (b).

The recovery information includes a list of free blocks, a list of log blocks, and a log pointer table which is the data structure for managing the log blocks. The log pointer table contains log pointer table entries corresponding one-to-one to the log blocks, each entry mapping a physical address of a log block to a logical address of a corresponding data block and storing logical addresses of requested pages of a data block in the order in which pages of a corresponding log block are physically arranged.

In another embodiment, a method for managing a flash memory including a data block and a log block for writing data for updating the data blocks includes the steps of: (a) allocating a predetermined region to a flash memory and writing lists of data blocks and log blocks and a data structure for managing the log blocks to the predetermined region as recovery information; (b) checking states currently being written to the flash memory based on the recovery information in the event of a system failure to determine whether an error occurs; and (c) if the error occurs, recovering data based on the recovery information.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
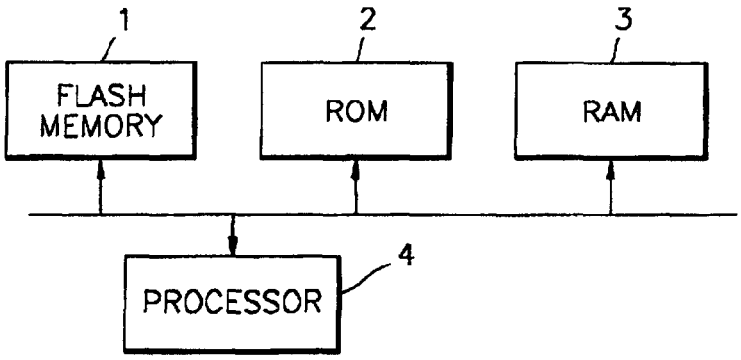
FIG. 1 is a block diagram of a flash memory based system according to a preferred embodiment of the present invention.

Referring to FIG. 1, a flash memory based system includes a flash memory 1, a read-only memory (ROM) 2, a random access memory (RAM) 3, and a processor 4. In combination with program codes typically recorded in the ROM 2, the processor 4 issues a series of read or write commands to read data from and write data to the flash memory 1 or the RAM 3. Write and read operations are performed on the flash memory 1 in accordance with a flash memory management method according to the present invention. The ROM 2 and the RAM 3 store application program codes executed by the processor 4 or related data structures.

Figure 2:
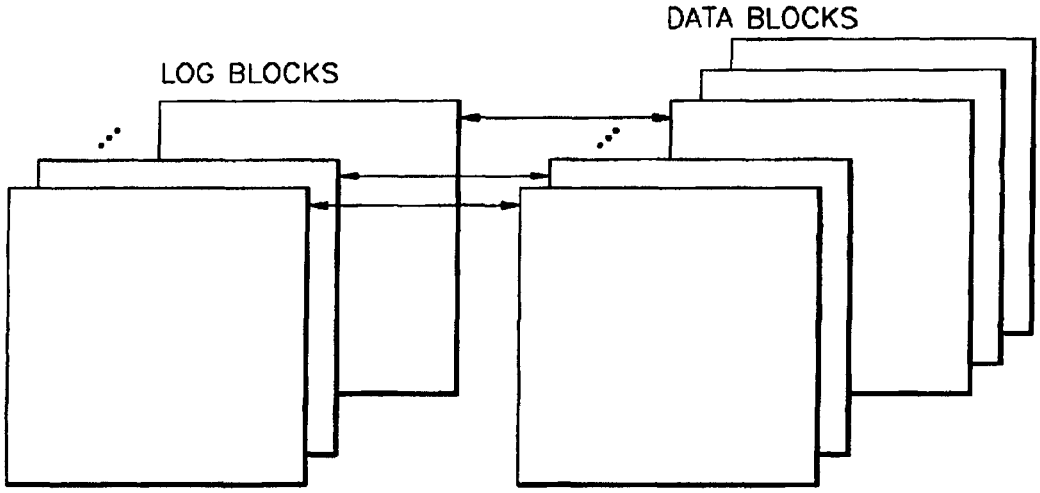
FIG. 2 is a reference diagram for explaining blocks for storing ordinary data provided in the flash memory of FIG. 1 according to the present invention.

Referring to FIG. 2, the flash memory 1 includes a plurality of data blocks and log blocks corresponding to at least some of the plurality of data blocks. A data block is a block for storing any ordinary data, and a log block is a block provided for recording modified data if a predetermined part of a data block is to be modified. Thus, a plurality of log blocks corresponding to the plurality of data blocks contain modified pages of the corresponding data blocks. Pages stored in the log blocks have priority over the counterparts stored in the corresponding data blocks to be referred to. In this specification, the pages having first priority are called "valid pages", and pages ignored by the valid pages even as physically valid data is recorded in the ignored pages are called "invalid pages" in a logical sense.

Figure 3:
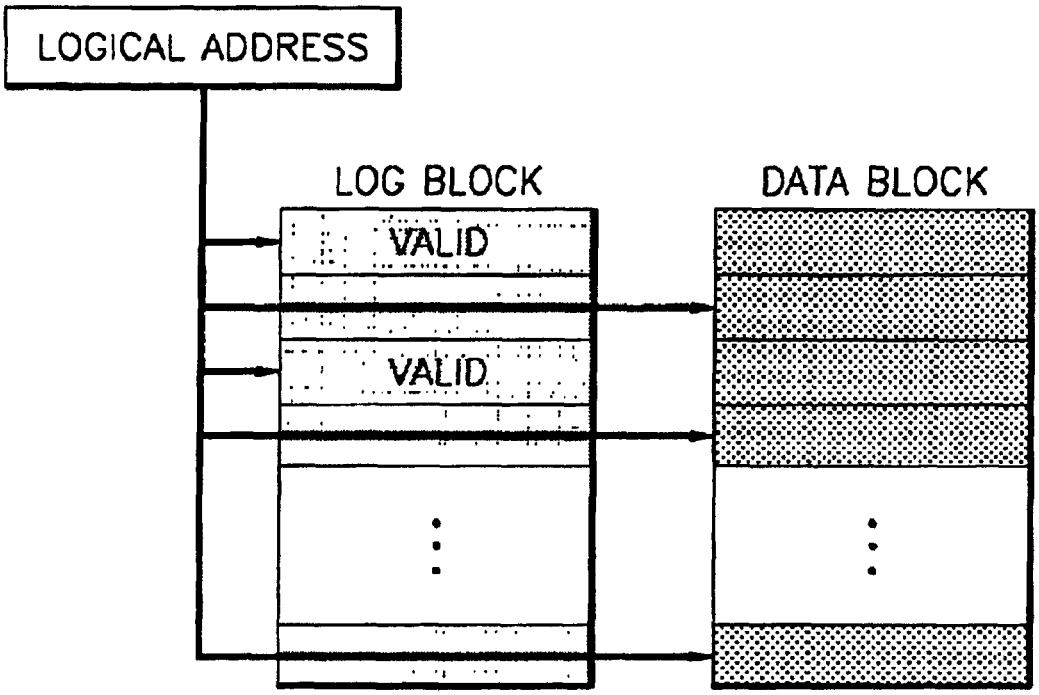
FIG. 3 is reference diagram for explaining a read operation for a log block and a data block.

Referring to FIG. 3, upon a request of a user to read a predetermined page at a predetermined logical address, the processor 4 refers to a log pointer table recorded in the RAM 3 to check whether a log block corresponding to the predetermined page exists. If a corresponding log block exists, a check is made as to whether the requested page is validly stored in the log block. If the requested page is validly stored in the log block, the page stored in the log block is read. If not, a corresponding page stored in the data block corresponding to the log block is read. The log pointer table will be described below.

Figure 4:
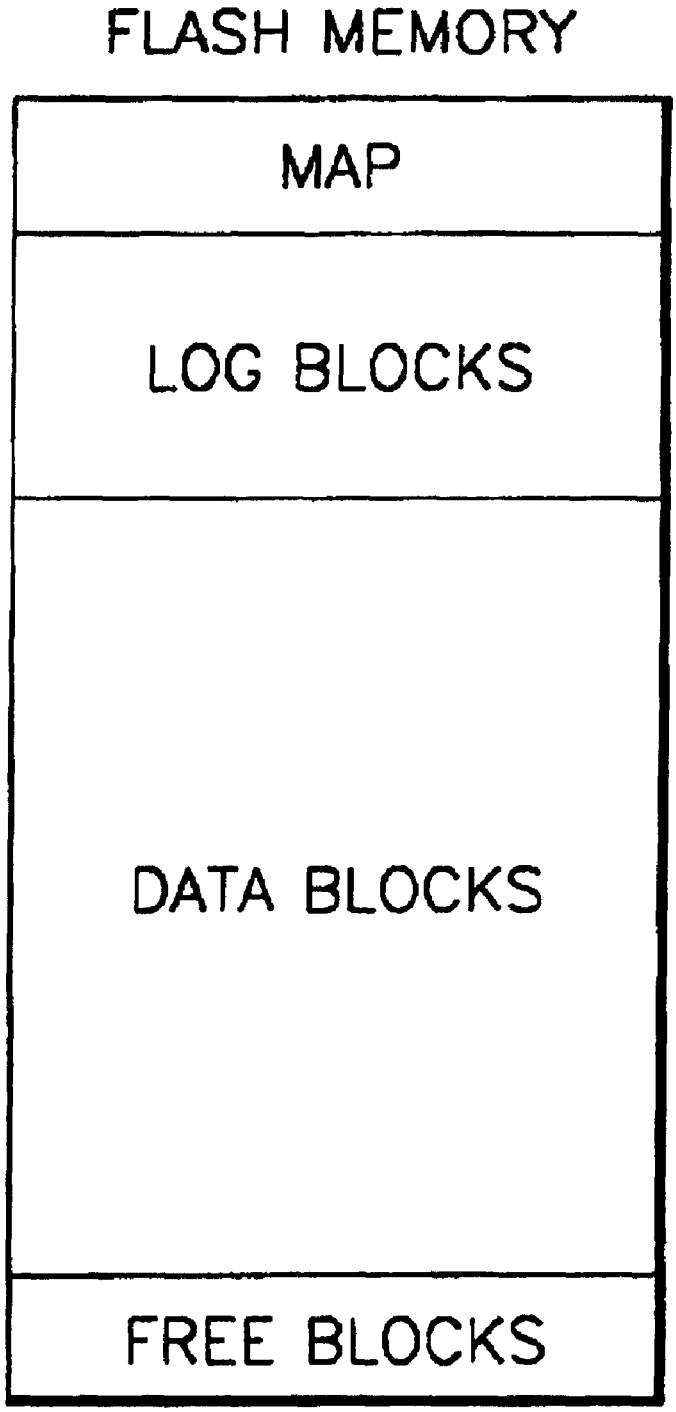
FIG. 4 is a reference diagram for explaining sections into which the flash memory of FIG. 1 is divided according to an embodiment of the present invention.

FIG. 4 is a reference diagram showing regions into which the flash memory 1 is divided according to an embodiment of the present invention. Referring to FIG. 4, the flash memory 1 is divided into a map region, a log block region, a data block region, and a free block region. The map region stores address conversion information, the log block region is provided for log blocks, the data block region is provided for data blocks to store ordinary data, and the free block region is provided for allocating log blocks or data blocks. Here, the flash memory 1 is logically divided to form the four regions. Thus, physically, the four regions, in particular, the data block region, the log block region, and the free block region could discontinuously exist in the flash memory 1 in several scattered regions.

Figure 5:
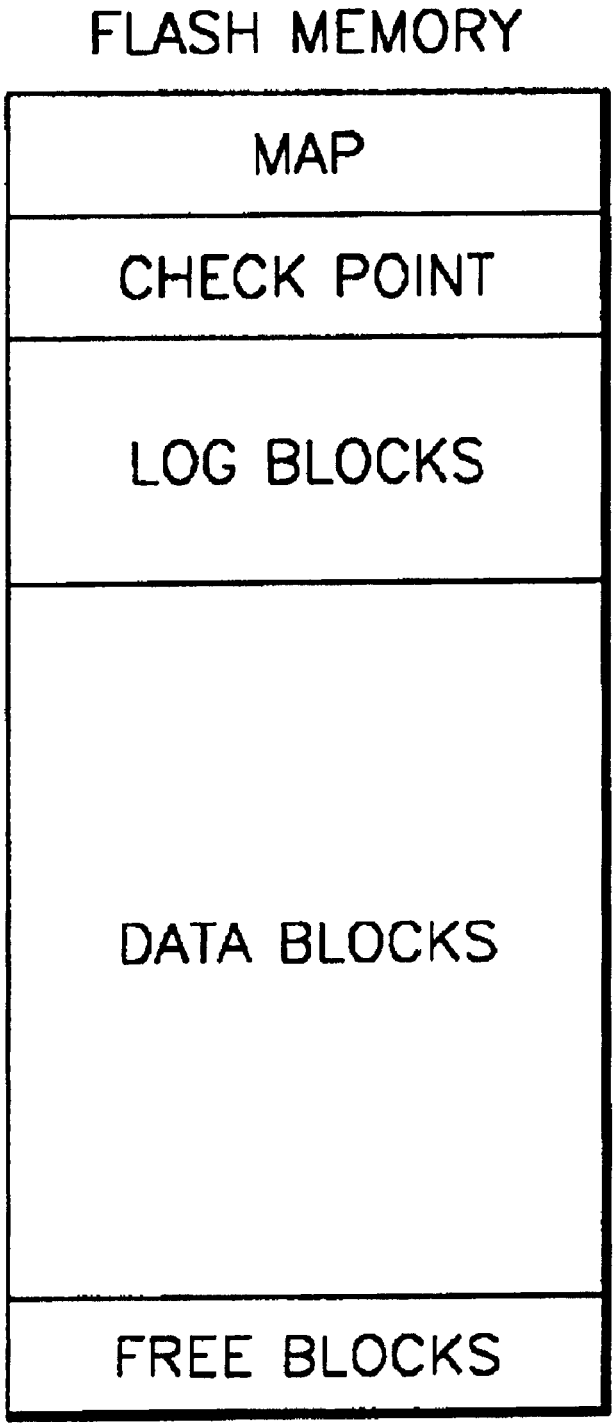
FIG. 5 is a reference diagram for explaining sections into which the flash memory of FIG. 1 is divided according to another embodiment of the present invention.

FIG. 5 is reference diagram showing regions into which the flash memory 1 is divided according to another embodiment of the present invention. Referring to FIG. 5, the flash memory 1 is divided into a map region, a check point region, a log block region, a data block region, and a free block region. In this embodiment, the check point region is additionally provided. Recovery information required for data recovery is recorded in the check point region. Similar to the regions shown in FIG. 4, the map region stores address conversion information, the log block region is provided for allocating log blocks, the data block region records ordinary data, and the free block region is provided for allocating log blocks or data blocks. The address conversion information and the recovery information stored in the map region and the check point region, respectively, will be described below in detail.

Figure 6:
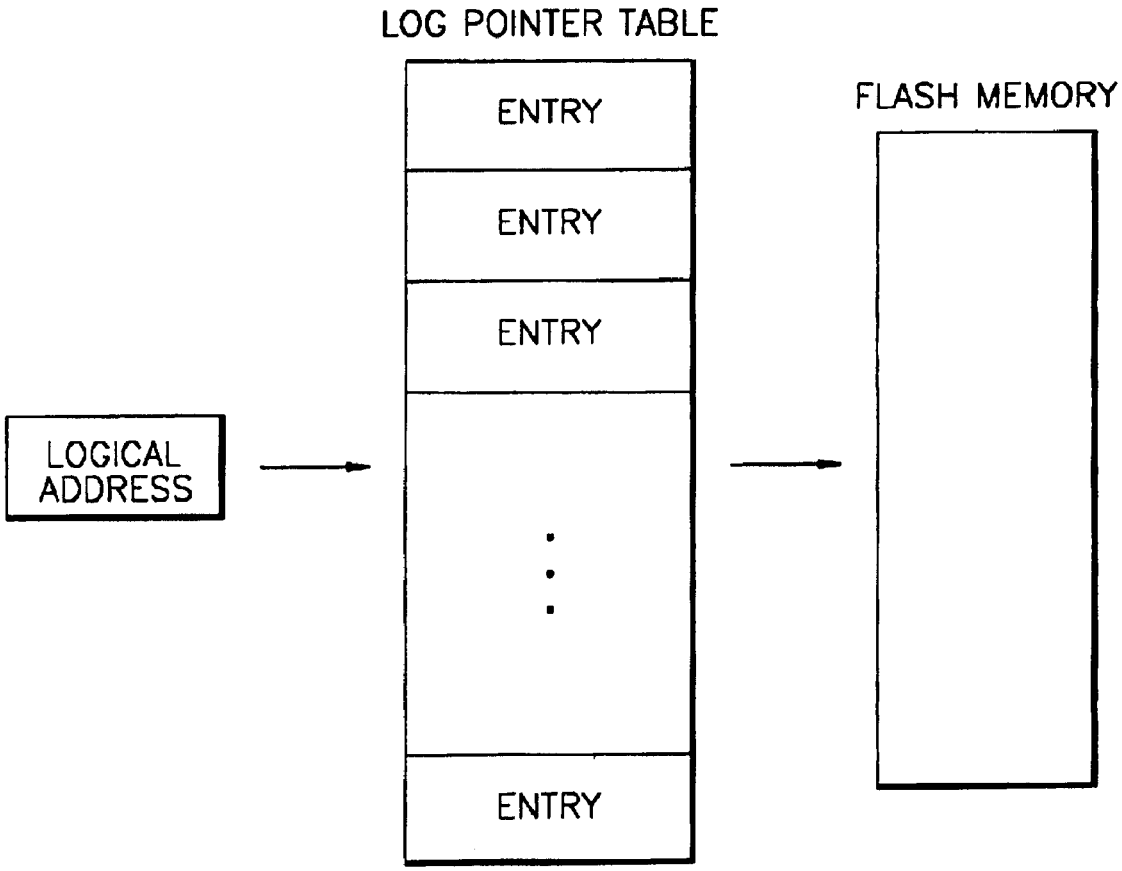
FIG. 6 is a reference diagram for explaining a log pointer table.

The log pointer table refers to a data structure for managing log blocks. The log pointer table contains a logical address of a data block, a physical address of a corresponding log block, and offset values (a logical address of a requested page) of updated pages in the corresponding data block arranged in the same order in which pages in the log block are physically arranged. According to the present invention, the processor 4 scans a log block region to construct the log pointer table in the RAM 3. Referring to FIG. 6, the log pointer table contains entries corresponding to each of the log blocks. Upon receiving a request to read data from or write data to a specific location in the flash memory 1 along with a logical address of a predetermined page, the processor 4 refers to the log pointer table to access a log block or a data block depending on the presence of a corresponding entry.

Figure 7:
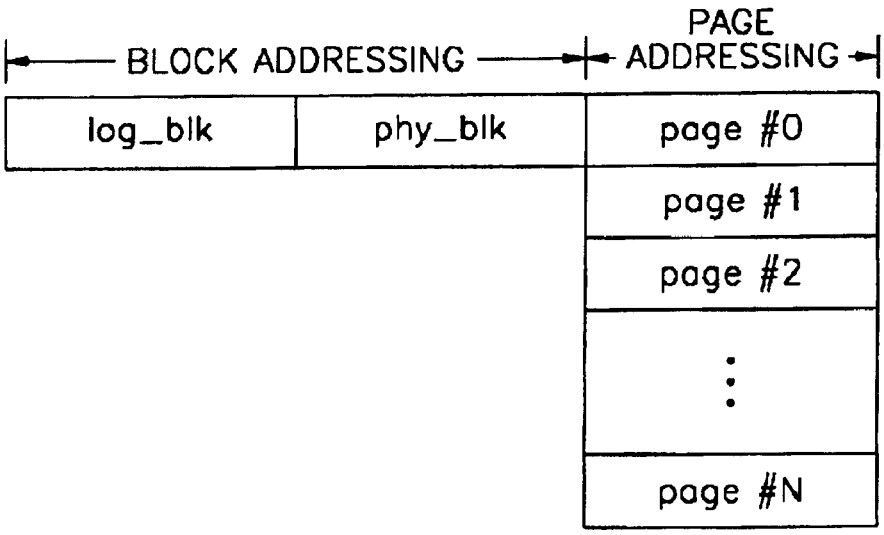
FIG. 7 shows the structure of an entry of a log pointer table.

FIG. 7 shows the structure of a log pointer table entry. Referring to FIG. 7, the log pointer table entry contains a logical address log_blk of a data block and a physical address phy_blk of a corresponding log block. Also, the log pointer table entry records logical addresses page #0, page#1, . . . , page #N of corresponding pages in the log block in an order in which pages in the data block are recorded.

For example, assuming that a block contains sixteen pages and a logical address is 02FF (hexadecimal number), the first three digits "02F" denote a block address and the last digit "F" denotes an offset value of a requested page in a log block. Thus, a check is made as to whether 02F exists among logical addresses log_blk stored in the logical pointer table to confirm the presence of a corresponding log block. If the corresponding log block exists, it is checked whether the logical address 02FF of the requested page or the offset value F is recorded in the corresponding entry to locate an updated page in the log block. For example, if page #0 is F, the requested page is recorded in the first physical page in the log block.

In this way, a portion of a requested logical address, that is, a block address portion thereof, is used to check whether a log block exists and access the block. This technique is called "block addressing". Then, the entire logical address being requested or an offset value is used to access a page in the corresponding log block, which is called "page addressing". Thus, the present invention adopts both block addressing and page addressing to enable the same page updated many times to be recorded in one log block.

Figure 8:
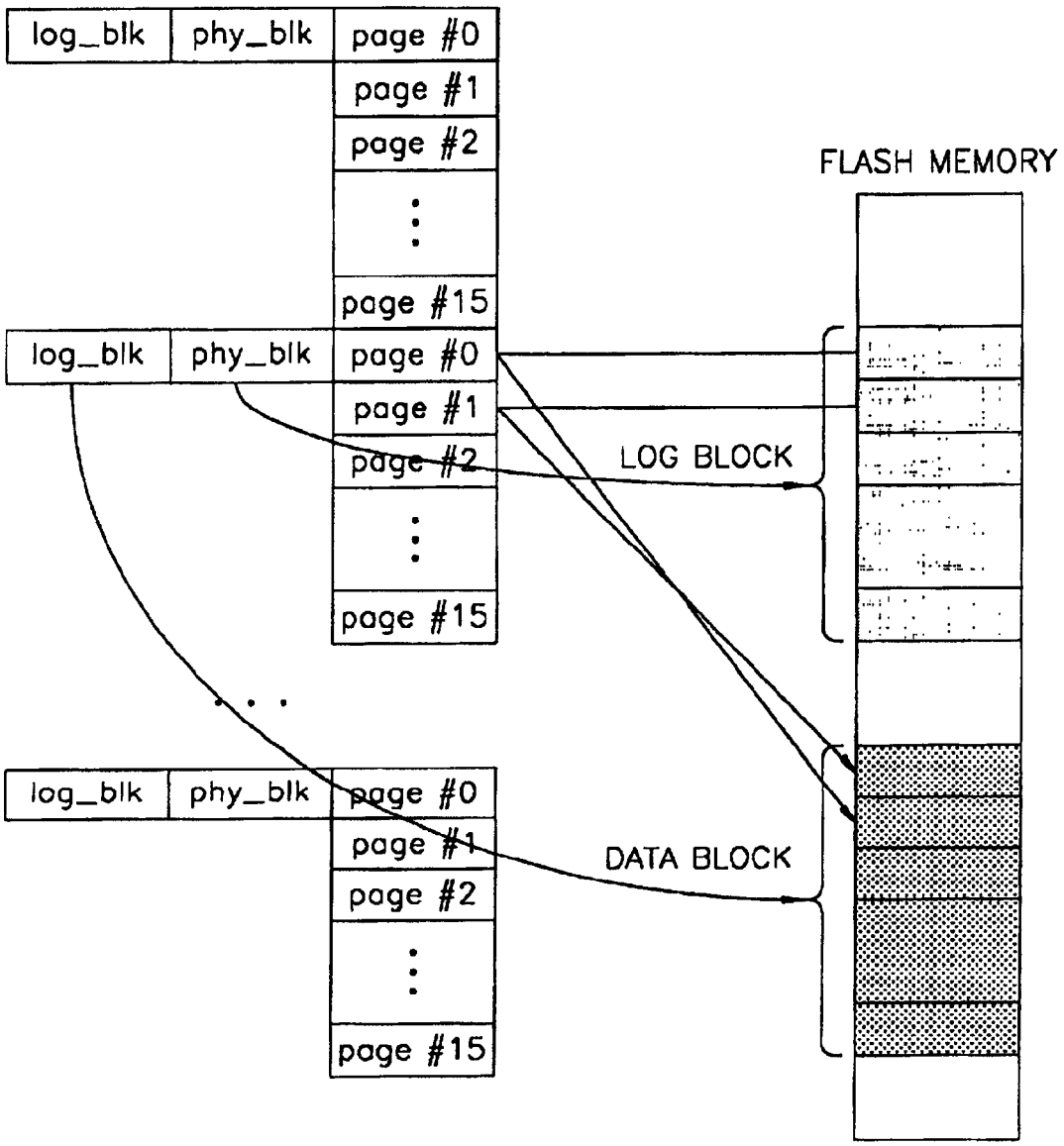
FIG. 8 shows the relationship between a log pointer table and a flash memory.

FIG. 8 is a reference diagram showing the relationship between the log pointer table and the flash memory 1. As shown in FIG. 8, the logical address log_blk of a data block is used to search for a log block corresponding to the data block, and then a physical address phy_blk is used to find a location to which the corresponding log block is written. Furthermore, according to the present invention, logical addresses page #0, page #1, . . . , page #15 of pages in the corresponding log block are written to the log pointer table entry. In this embodiment, each block contains sixteen pages.

Basically, updated pages are written to the log block at the same positions as those at which the corresponding pages are located in the data block. Actually, if an updated page is first written to the log block, the updated page may be written at the same position as the corresponding page of the data block. However, if the updated page is to be updated again, it is not always possible to be written at the same position as the corresponding page of the data block. That is, if the predetermined page in the corresponding data block is updated once again before updating the remaining pages in the data block once, the predetermined page is written to an empty space of the log block.

Figure 9:
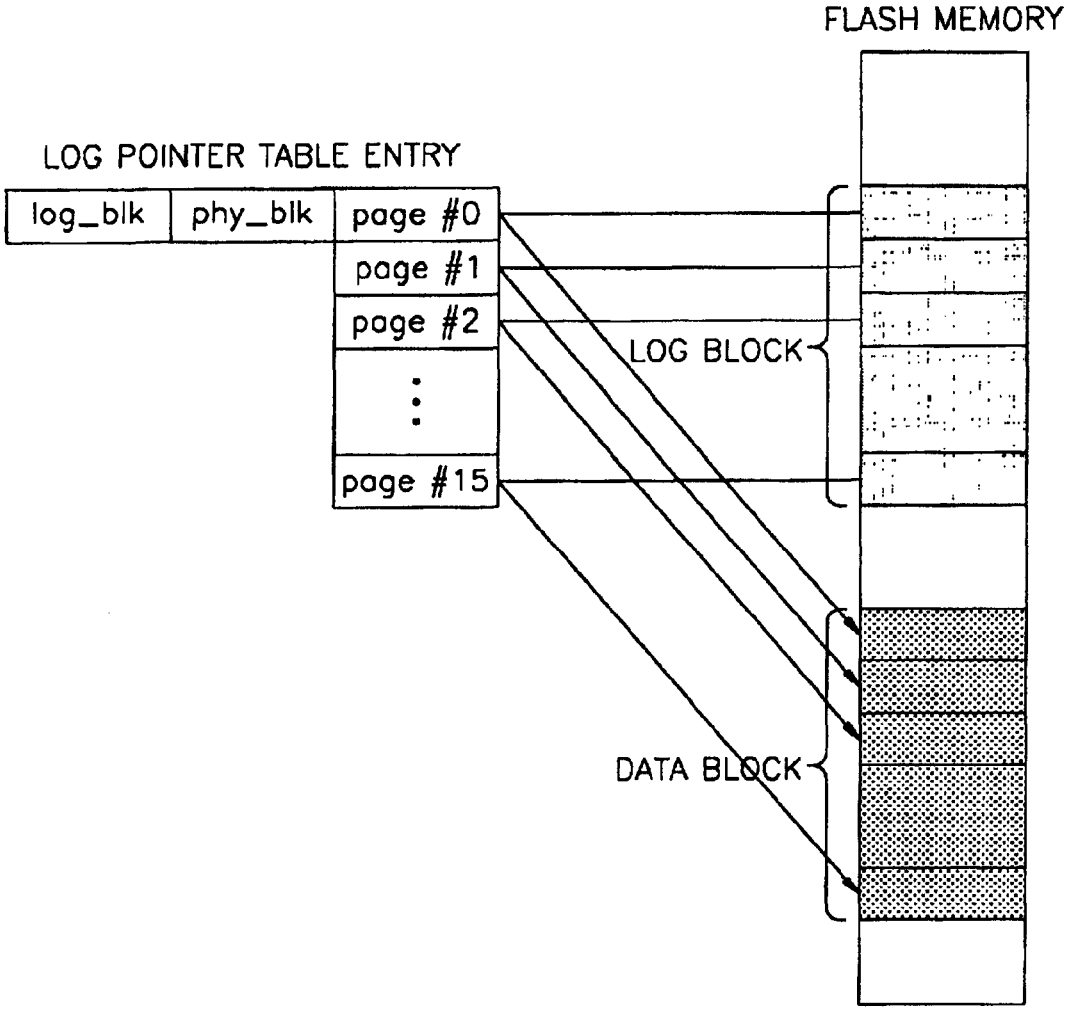
FIG. 9 is a reference diagram for explaining an erasable block.

FIG. 9 is a reference diagram for explaining an erasable block. If all pages in a data block are updated only once, pages of a log block map one-to-one with those of the data block. In this case, since the log block contains all the content of the data block, data loss does not occur even if the data block is erased. The (entirely shadowed) data block where valid data does not exist any more is called an "erasable block". The erased block is called a "free block". The erasable block can be erased any time, and the free block can be allocated as a data block or a log block when necessary for the application.

Meanwhile, the present invention involves performing a block merge. The block merge is performed when a write operation is repeated so that a page that can be written does not exist in the log block. In this case, the log block and the corresponding data block are merged to create a new data block while erasing the previous log block to be a free block. In particular, a block merge performed when all pages in a data block are updated only once to arrange the pages in the data block in the order in which pages are located in the log block is called a "switch merge".

In contrast, if the page arrangement in a log block is not the same as that in a corresponding data block, a simple merge is performed. Furthermore, the simple merge is performed when all pages of the log block are currently written or read so a new log block needs to be allocated for a newly requested write operation. In this case, the log block to be merged may have a free page.

If all the pages in a log block are updated only once, empty pages are filled with corresponding pages of a data block to change the log block to the data block. This is called a "copy merge". That is to say, there are three types of block merges; a switch merge, a simple merge, and a copy merge.

As described above with reference to FIG. 9, the switch merge is performed by changing a log block in which all pages of a corresponding data block are updated only once to a data block. This change is made by updating address conversion information without copying of data that have been written to the data block or the log block. That is, address conversion information recorded in a map region is updated so that the corresponding log block is mapped to a logical address requested by the user. The map region stores address conversion information for every block to enable block addressing. Here, an invalid page refers to a page ignored by valid pages, and in actual implementation, the invalid page may be physically valid.

Figure 10:
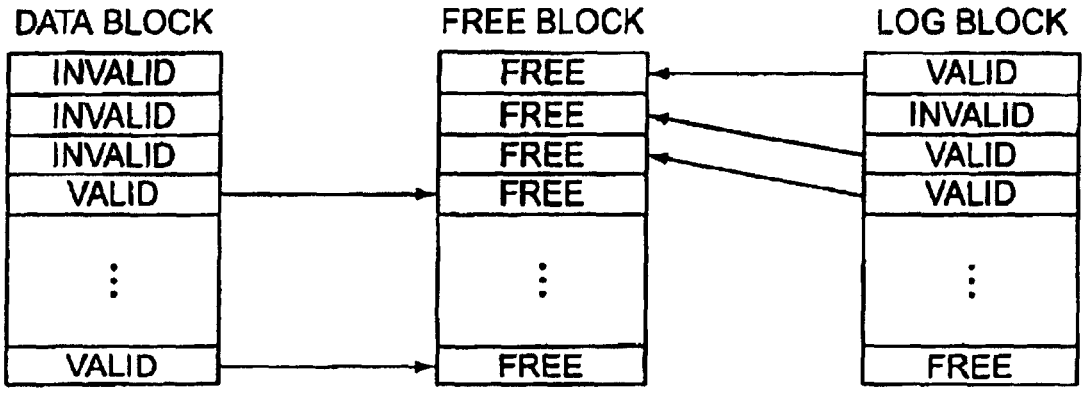
FIG. 10 is a conceptual diagram of a simple merge.

As shown in FIG. 10, a simple merge is performed to create a new data block by writing valid pages of a data block and a corresponding log block at the same positions in a new free block as the positions at which the valid pages were written to the data block and the log block. Thus, the merged data block and the log block can be erasable blocks.

Figure 11:
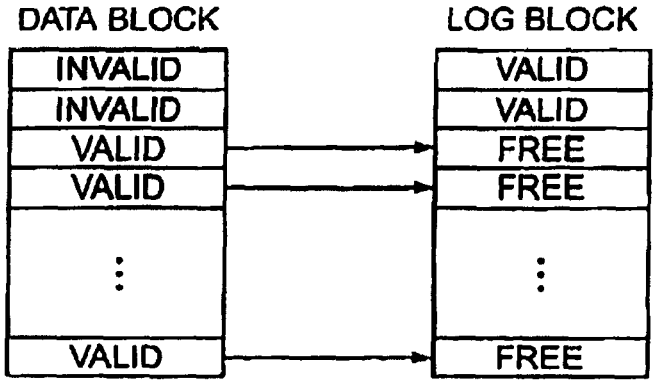
FIG. 11 is a conceptual diagram of a copy merge.

As shown in FIG. 11, a copy merge is performed by copying valid pages written to the existing data block to free pages in a corresponding log block. The existing data block is changed to an erasable block. As described, invalid pages used in the block merge are to pages not firstly referred to, and in actual implementation, they may be physically valid pages.

Figure 12:
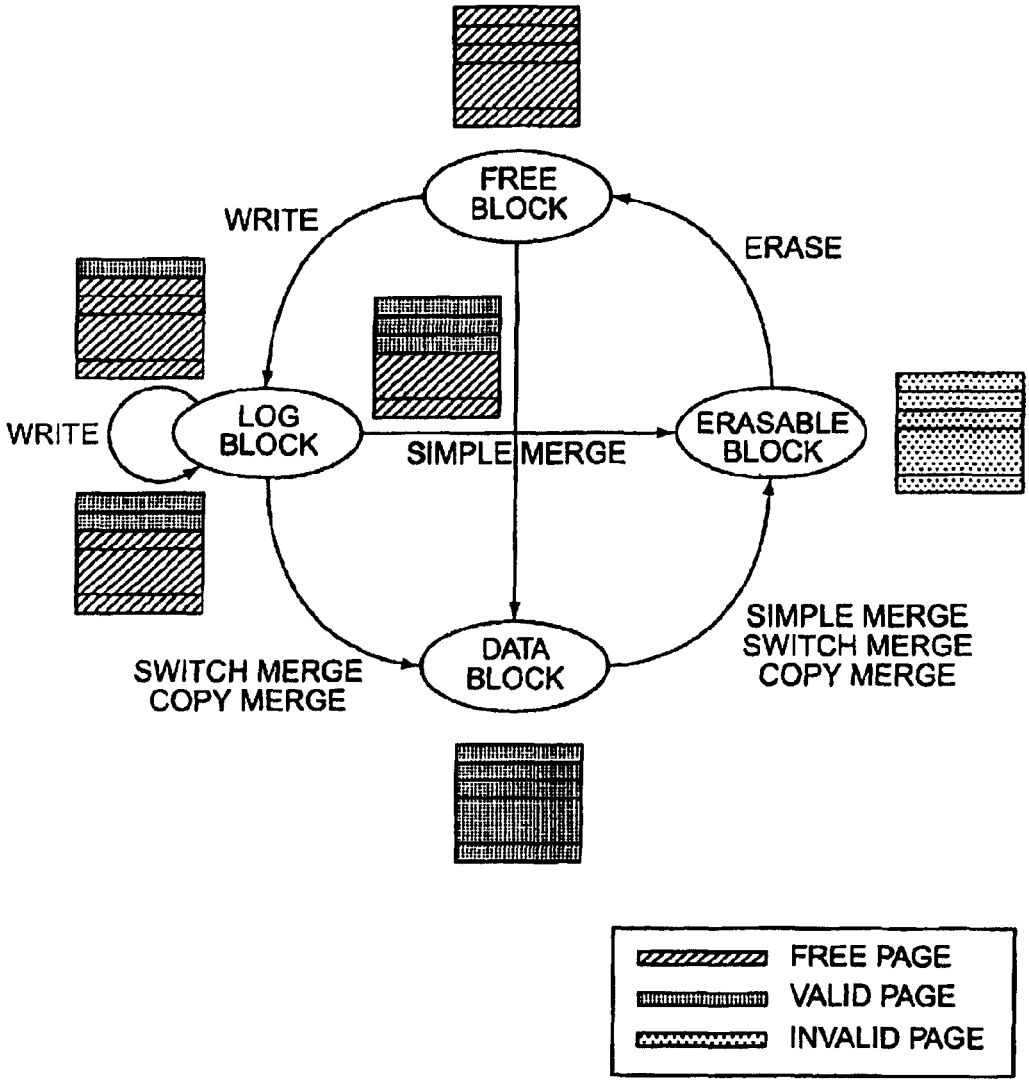
FIG. 12 shows changes in blocks when a block merge according to the present invention is performed.

FIG. 12 shows changes in blocks as a block merge according to the present invention is performed. Referring to FIG. 12, a free block is changed to a log block or a data block. A log block is changed to a data block through a switch merge or a copy merge or to an erasable block through a simple merge. A data block is changed to an erasable block through a switch merge, a copy merge, or a simple merge. An erasable block is erased to be a free block again.

To perform a block merge, lists for free blocks and erasable blocks residing in the flash memory 1 are required. The lists for free blocks and erasable blocks refer to a data structure recorded in the RAM 3 along with a log pointer table. The lists may be recorded in the map region and the check point region of the flash memory 1.

A list of free blocks, a list of erasable blocks, and a log pointer table must be reconstructed in the RAM 3 during a system reset. The check point region is allocated according to an embodiment of the present invention for recording recovery information required for quick and thorough recovery of these data structures. If the check point region is provided, the list of free blocks, the list of erasable blocks, and the list of log blocks described above are stored in the check point region as recovery information. In particular, the check point region also stores a plan log that lists which type of block merge is to be performed and changes in blocks as a result of the block merge in order to prevent loss of information due to an overwhelmed system, unexpected power outage and the like, which may occur during the block merge. More specifically, the plan log contains the type of block merge to be performed, and physical addresses of a block changed from a free block to a data block, of a block changed from a data block to a free block, and of a block changed from a log block to a free block.

Furthermore, the check point region stores information necessary for construction of the address conversion information such as a location where address conversion information is stored. The location of the check point region itself is recorded in a predefined block in the flash memory 1.

Based on the above configurations, a method for flash memory management according to a preferred embodiment of the present invention will now be described. For ease of understanding, the flash memory management method is divided into a method of constructing and reconstructing a data structure upon a system startup, a method for reading data from the flash memory 1, and a method for writing data to the flash memory 1.

First, a flash memory management method used during a system startup means a method for constructing or reconstructing a data structure. That is, the method involves constructing address conversion information as well as data structures including a list of free blocks, a list of erasable blocks, a list of log blocks, and a log pointer table for write and read operations, and examining the integrity of the constructed information to reconstruct the data structures based on recovery information if reconstruction is needed. When the system of FIG. 1 is initialized, the processor 4 must construct the log pointer table and the lists of free blocks, erasable blocks and log blocks. To accomplish this, the processor 4 reads recovery information from most recently written pages stored in the check point region of the flash memory 1. This is because, if the recovery information is sequentially written, most recent recovery information is written to a page located immediately before a free page (empty page) firstly found in the check point region. However, the order in which the recovery information is written may be changed when necessary for the application as long as it is possible to identify the most recently written page.

The log pointer table is constructed by scanning all pages of each log block designated in the recovery information to read a logical address stored in a logical block address portion for each page. Since the map region also sequentially stores address conversion information, a lastly written page (the page immediately before a first free page) is considered to be changed most recently, and address conversion information can be constructed based on the lastly written page. The free block list and the erasable block list can also be readily reconstructed based on the recovery information.

Next, the constructed information including the log pointer table and the lists of free blocks, erasable blocks and log blocks is verified by referring to a plan log. That is, it should be verified whether the constructed information is the same as real conditions when the operation of the system is stopped during a block merge. More specifically, if the system ceases to operate upon writing recovery information to the check point region, upon performing a block merge, upon updating address conversion information in the map region, and upon performing an erase operation, verification is needed. For each case, it is checked whether the constructed information is consistent with real conditions, and if not, the constructed information is reconstructed as follows:

1. When the system ceases to operate upon writing recovery information to the check point region, a first free page from the recovery information written in the check point region is located to check whether the found page is actually an empty page by reading data stored therein. If the free page is not empty, it is determined that the system ceased to operate while writing recovery information to the check point region. Since this occurs before actually writing data, it is not necessary to perform a recovery procedure, and finally recorded recovery information is ignored.

2. When the system ceases to operate during a block merge, it is checked whether data has been properly written to all pages of a block listed in the plan log as a block to be changed to a data block. If a page, if any, is not valid, it is determined that the system ceased to operate during a block merge. In this case, a block merge is performed again to recover data appropriately.

3. When the system ceases to operate while updating address conversion information, a logical address is read from a block listed in the plan log as a block to be changed to a data block to check whether the logical address is consistent with the information stored in the map region. If not, it can be determined that the system ceased to operate while updating the address conversion information. In this case, data can be appropriately recovered by modifying the address conversion information based on the logical address read from the data block and a corresponding physical address.

4. When the system ceases to operate during an erase operation, it is checked whether blocks listed in the plan log as a block to be changed to a free block are actually empty blocks. If a block is a not free block (if all pages in the block are not empty), an erase operation is performed on the written block again.

When required data structures are constructed and then integrity verification is completed in the manner previously described through a flash memory management method used upon system startup, read and write operations can be performed.

Figure 13:
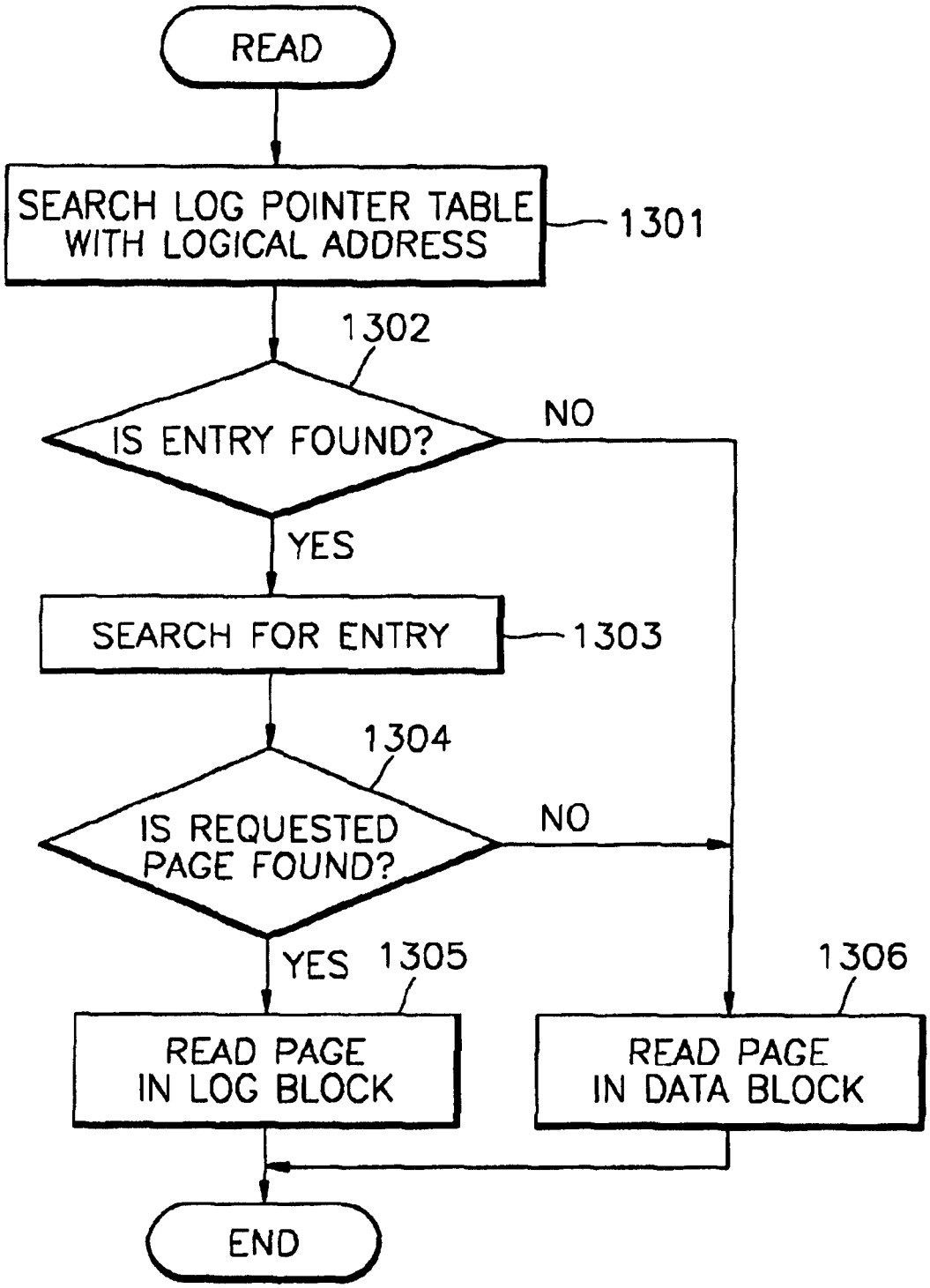
FIG. 13 is a flowchart of a read operation according to the present invention.

FIG. 13, is a flowchart of a read operation according to the present invention. The processor 4 searches for a log block in which a page being requested exists, and reads the requested page from the found log block. More specifically, the processor 4 sequentially searches a log pointer table for an entry corresponding to a logical address of a requested page (step 1301). Since the logical address of the requested page consists of a block addressing portion and a page addressing portion, an entry is searched for by referring to the block addressing portion. If a matched entry is found (step 1302), it is checked whether the requested page exists in the found entry (step 1303). If the requested page is found, the page is read (step 1305). In this case, if two or more identical pages are found, a lastly found page among those except for one existing at the position of the same offset value is determined to be the latest one, and that page is read. If a match is not found in the step 1302, or if the requested page does not exist in a log block (step 1304), a corresponding page of a data block is read based on the requested logical address (step 1306).

Figure 14:
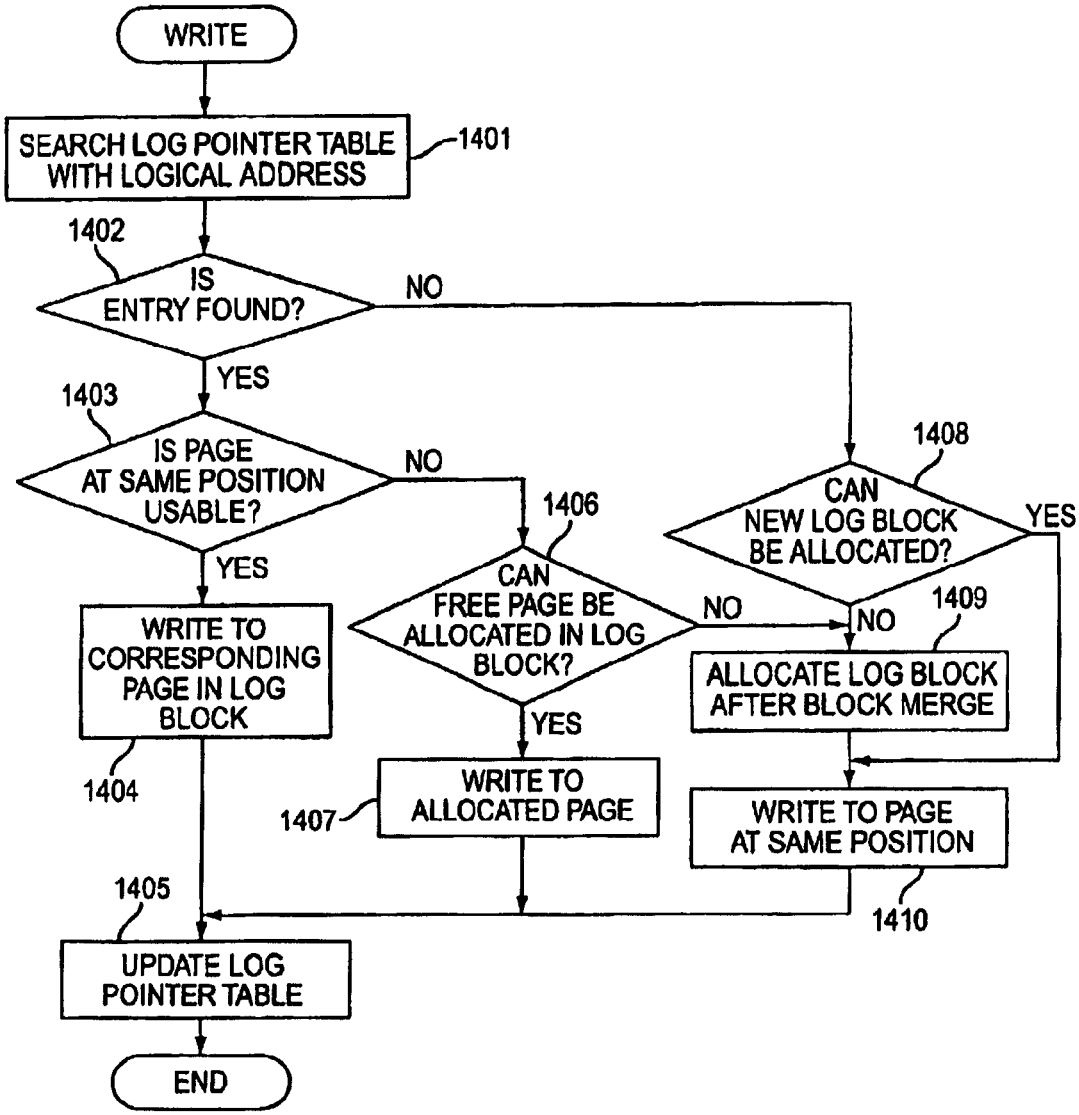
FIG. 14 is a flowchart of a write operation according to the present invention.

FIG. 14 is a flowchart of a write operation according to the present invention. The processor 4 firstly searches for a log block in which a page being requested exists. If the log block is found, it checks whether a page in the log block at the same position as the requested page is usable. If the corresponding page is usable, writing is performed on the page. If it is not usable, writing is performed on another page that is usable in the log block. If a usable page does not exist in the log block, a new log block is allocated to perform writing at the same position.

More specifically, the processor 4 searches a log pointer table for an entry based on a logical address of a page being requested (step 1401). If the entry is found (step 1402), which means that a log block corresponding to the logical address exists, an entry is searched to check whether a page having the same offset value as the requested page is usable (step 1403). If the page is usable, a write operation is performed on the corresponding page (step 1404). Here, the usable page refers to an empty page (free page) that has not been written to. The presence of a free page can be determined by whether a page is valid (the page is firstly referred to or data is written to the page). Next, a physical address of the page on which the write operation has been performed corresponding to the logical address is written to the corresponding entry of the log pointer table. In this case, the write request by the user is completed by one write operation in the flash memory 1.

If the corresponding log block is found, but the page having the same offset has been used (step 1403), it is checked whether another free page in the log block can be allocated (step 1406), and a write operation is performed on the allocated free page (step 1407). If two or more free pages exist, the log block is sequentially searched from the start to allocate a page closest to the page corresponding to the requested page to which data have been already written. Then, a physical address of the allocated page corresponding to the logical address of the requested page is written to the corresponding entry of the log pointer table (step 1405).

If an entry corresponding to the requested page is not found as a result of searching the log pointer table, it is checked whether a new log block can be allocated (step 1408). If free blocks to be allocated as the new log block exist, one of the free blocks is allocated as the new log block (step 1408). If a free block does not exist, the free block is created by performing a block merge and then allocated as the new log block (step 1409). A write operation is performed on a page in the allocated log block having the same offset value as the requested page (step 1410). Then, a corresponding entry is created in the log pointer table (step 1405).

Figure 15:
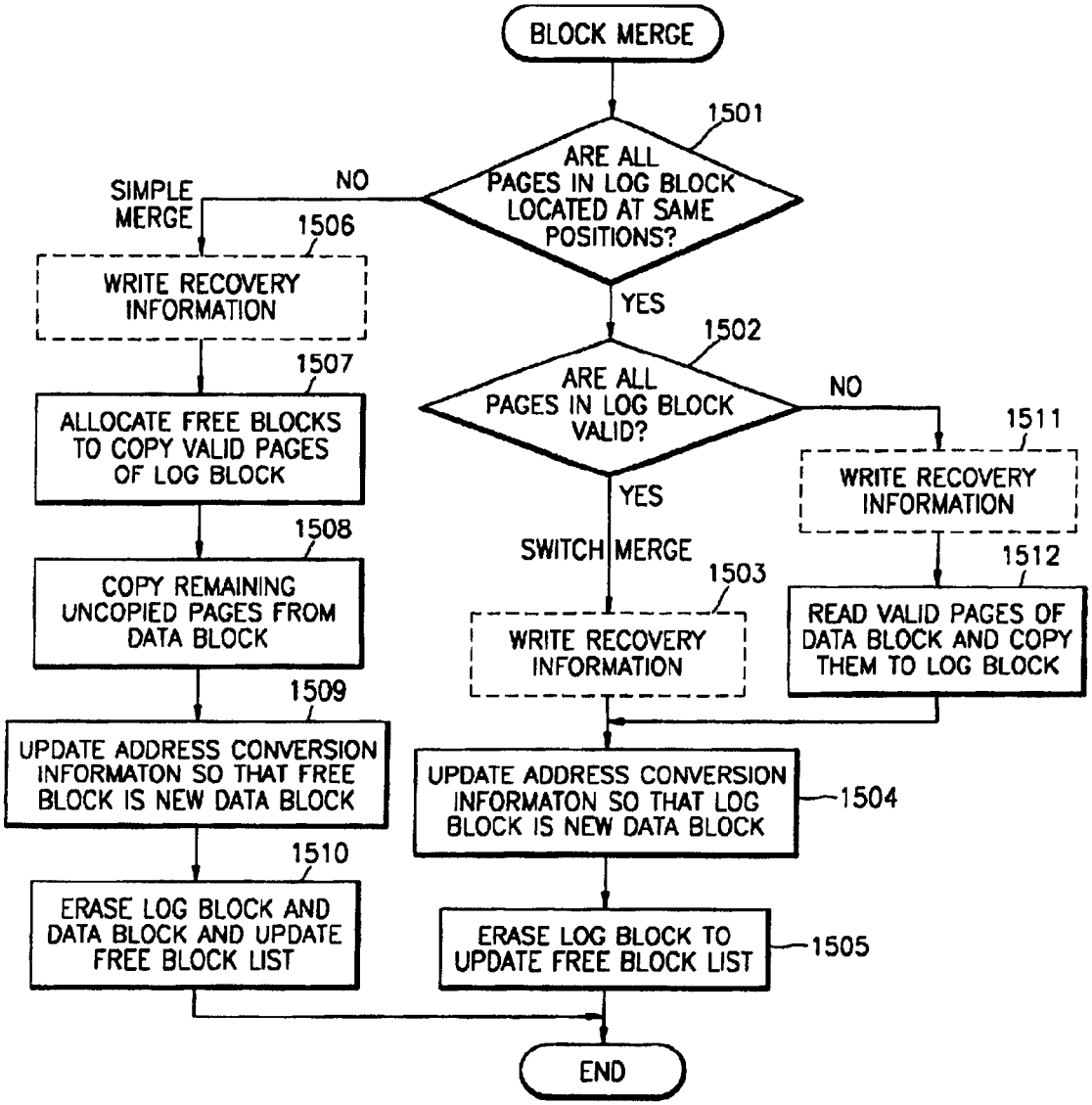
FIG. 15 is a flowchart of a block merge operation.

FIG. 15 is a flowchart of a block merge operation. Referring to FIG. 15, a block merge is performed in different ways depending on the arrangement of pages in a log block. More specifically, the processor 4 checks whether all pages of a log block are located at the same positions as those of a corresponding data block (step 1501). If so, it is next checked whether all the pages of the log block are valid (step 1502). If all pages in the log block are arranged in the same order in which those of the data block are arranged and they are valid, a switch merge is performed. Before performing a switch merge, the processor 4 writes recovery information to the check point region (step 1503). The step 1503 may be omitted according to the choice of a system designer. To perform a switch merge, the processor 4 updates address conversion information stored in the map region so that the log block is a new data block (step 1504). That is, if the log block is changed to the new data block, since a physical address corresponding to the logical address is changed in view of the user, the address conversion information must be updated. Actually, the updated address conversion information can be written to a first free page in the map region. Similarly, the map region sequentially stores the address conversion information, and if a free page does not exist, a free block is allocated for the map region to write the information to the allocated free block. The allocation of a free block is made in the same manner as described with reference to FIG. 14. Then, the data block is changed to an erasable block, the data block is erased, and a free block list recorded in the check point region is updated (step 1505).

If any pages in the log block are not arranged at the same position as a corresponding page of the data block, a simple merge is performed. Similarly, the processor 4 writes recovery information to the check point region before performing a simple merge (step 1506). The step 1506 may be omitted according to the choice of the system designer. Then, free blocks are allocated to copy valid pages of the log block to some of the free blocks (step 1507). Corresponding pages of the data block are copied to the remaining free blocks (step 1508). Address conversion information in the map region is updated so that the free blocks are new data blocks (step 1509). The allocation of free blocks is made in the manner described with reference to FIG. 14. The log block and the data block are changed to an erasable block, the log block and the data block are erased, and a free block list recorded in the check point region is updated (step 1510).

If all pages of the log block are arranged in the same manner in which those of the data block are arranged but some of the pages in the data block do not exist in the log block, a copy merge is performed. Similarly, the processor 4 writes recovery information to the check point region before performing a copy merge (step 1511).

The step 1511 may be omitted according to the choice of the system designer. Then, valid pages of the data block are read to copy them to the log block (step 1512). Address conversion information stored in the map region is updated so that the log block is a new data block (step 1504), and then the data block is erased and a free block list stored in the check point region is updated (step 1505).

In this way, if the log block for updating data is not found, a free block is allocated, the free block is changed to a log block, and writing to the log block is performed. If only one free block remains so it is not allocated as a log block, one of the existing log blocks is arbitrarily selected to perform a block merge, thereby creating a new free block. Then, the free block is allocated as a log block. In this invention, costs required for a block merge and usability of blocks should be appropriately considered. The usability of blocks may vary depending on the type of application program to be executed. Replacement algorithms may not be specified in this invention. Thus, the present invention may be implemented using common replacement algorithms such as least recently used (LRU).

As described above, the present invention provides a method for flash memory management for improving the performance of a flash memory. Conventionally, in order to update a part of one data block, the remaining parts are also copied or a large amount of address conversion information is needed. However, the present invention allows the same page to be continuously updated within one log block, thereby improving the effectiveness of flash memory resources. Furthermore, the present invention allows data to be recovered consistently in the event that a system malfunctions due to power outage during a block merge.

What is claimed is:

[1. A method for writing predetermined data to a flash memory, the method comprising the steps of:

(a) receiving a request to write the predetermined data to a page to which data has been written;

(b) writing the predetermined data to a log block corresponding to a data block containing the page;

(c) receiving a request to write the predetermined data to the page again; and (d) writing the predetermined data to an empty free page in the log block.]

[2. The method of claim 1, wherein the step (b) comprises the step (b11) of writing the predetermined data to an empty free page.]

3. [The method of claim 1] *A method for writing predetermined data to a flash memory, the method comprising the steps of:*

(*a*) *receiving a request to write the predetermined data to a page to which data has been written;*

(*b*) *writing the predetermined data to a log block corresponding to a data block containing the page;*

(*c*) *receiving a request to write the predetermined data to the page again; and*

(*d*) *writing the predetermined data to an empty free page in the log block*, wherein the step (b) comprises the steps of:

(b21) allocating the log block; and (b22) writing the predetermined data to an empty page at the same position as the requested page in the data block.

[4. The method of claim 1, wherein the data block is configured to store data and the log block is configured to store data which has been modified.]

[5. A method for writing predetermined data to a flash memory, the method comprising the steps of:

(a) receiving a request to write the predetermined data to a page;

(b) allocating a log block 1-1 corresponding to a first data block containing the page;

(c) writing the predetermined data to an empty page in the log block 1-1;

(d) receiving a request to write the predetermined data to the page again; and (e) writing the predetermined data to an empty free page in the log block 1-1.]

6. [The method of claim 5] *A method for writing predetermined data to a flash memory, the method comprising the steps of:*

(*a*) *receiving a request to write the predetermined data to a page;*

(*b*) *allocating a log block 1-1 corresponding to a first data block containing the page;*

(*c*) *writing the predetermined data to an empty page in the log block 1-1;*

(*d*) *receiving a request to write the predetermined data to the page again; and*

(*e*) *writing the predetermined data to an empty free page in the log block 1-1,* wherein the step (b) comprises the steps of:

(b1) performing a block merge to create a third data block based on a second data block and a second log block corresponding to the second data block; and (*b*2) allocating a free block obtained by performing an erase operation on the second data block as the log block 1-1.

7. The method of claim 6, wherein the step (b1) is performed when a free block to be allocated as the log block 1-1 does not exist.

8. The method of claim 6, wherein the step (b1) is performed when all pages of the existing log block corresponding to the first data block have been used.

9. The method of claim 6, wherein the step (b1) comprises the step of (b11) performing a switch merge to change the second log block to the third data block when pages of the second log block are arranged in the same order that pages of the second data block are arranged, and the pages of the second log block correspond one-to-one to the pages of the second data block.

10. The method of claim 6, wherein the step (b1) comprises the step of (b12) performing a copy merge to copy corresponding pages of the second data block to free pages in the second log block and create the third data block when the pages in the second log block are requested to be written only once.

11. The method of claim 6, wherein the step (b1) comprises the step of (13) performing a simple merge to copy the latest pages in the second log block to free pages of a free block to which data has not been written and copy a corresponding page of the second data block to the remaining free pages thereof, thereby creating the third data block.

[12. The method of claim 5, wherein thestep (e) comprises the steps of:

(e1) allocating a new log block 1-2 if a free page does not exist in the log block 1-1 and (e2) writing the predetermined data to a free page in the log block 1-2.]

13. [The method of claim 12] *A method for writing predetermined data to a flash memory, the method comprising the steps of:*

(*a*) *receiving a request to write the predetermined data to a page;*

(*b*) *allocating a log block 1-1 corresponding to a first data block containing the page;*

(*c*) *writing the predetermined data to an empty page in the log block 1-1;*

(*d*) *receiving a request to write the predetermined data to the page again; and*

(*e*) *writing the predetermined data to an empty free page in the log block 1-1,*

*wherein the step* (*e*) *comprises the steps of:*

(*e1*) *allocating a new log block 1-2 if a free page does not exist in the log block 1-1, and*

(*e2*) *writing the predetermined data to a free page in the log block 1-2,* wherein the step (e1) comprises the steps of:

(e11) performing a switch merge to change the log block to a second data block when pages of the log block 1-1 are arranged in the order in which [5] pages of the first data block are arranged and the pages of the log block 1-1 correspond one-to-one to the pages of the first data block, and (e12) allocating a free block obtained by performing an erase operation on the first data block as the log block 1-2.

[14. The method of claim 12, wherein the step (e1) comprises the steps of: (e21) performing a copy merge to copy corresponding pages in the first data block to a free page in the log block 1-1 when pages in the log block 1-1 are requested to be written only once; and (e22) allocating a free block obtained by performing an erase operation on the first data block as the log block 1-2.]

15. [The method of claim 12,] *A method for writing predetermined data to a flash memory, the method comprising the steps of:*

(*a*) *receiving a request to write the predetermined data to a page;*

(*b*) *allocating a log block 1-1 corresponding to a first data block containing the page;*

(*c*) *writing the predetermined data to an empty page in the log block 1-1;*

(*d*) *receiving a request to write the predetermined data to the page again; and*

(*e*) *writing the predetermined data to an empty free page in the log block 1-1,*

*wherein the step* (*e*) *comprises the steps of:*

(*e1*) *allocating a new log block 1-2 if a free page does not exist in the log block 1-1, and*

(*e2*) *writing the predetermined data to a free page in the log block 1-2, and* wherein the step (e1) comprises the steps of:

(e31) performing a simple merge to copy the latest pages in the log block 1-1 to free pages of a free block and copy a corresponding page of the first data block to the remaining free pages thereof, thereby creating a second data block; and (e32) allocating a free block obtained by performing an erase operation on the first data block or the log block 1-1 as the log block 1-2.

16. [The method of claim 12,] *A method for writing predetermined data to a flash memory, the method comprising the steps of:*

(*a*) *receiving a request to write the predetermined data to a page;*

(*b*) *allocating a log block 1-1 corresponding to a first data block containing the page;*

(*c*) *writing the predetermined data to an empty page in the log block 1-1;*

(*d*) *receiving a request to write the predetermined data to the page again; and*

(*e*) *writing the predetermined data to an empty free page in the log block 1-1,*

*wherein the step* (*e*) *comprises the steps of:*

(*e1*) *allocating a new log block 1-2 if a free page does not exist in the log block 1-1, and*

(*e2*) *writing the predetermined data to a free page in the log block 1-2, and* wherein the step (e2) comprises the step of (e21) writing the predetermined data to a free page at the same position as the requested page in the data block.

[17. The method of claim 5, wherein the first data block is configured to store data and the log block 1-1 is configured to store data which has been modified.]

*18. A method for writing predetermined data to a flash memory comprising a plurality of data blocks and a plurality of log blocks, the method comprising:*

*(a) receiving a request to write the predetermined data to a page of a first data block, among the data blocks, to which data has been written;*

*(b) writing the predetermined data to a first log block, among the log blocks, corresponding to the first data block containing the page;*

*(c) receiving a request to write the predetermined data which has been modified, to the page again; and*

*(d) writing the predetermined data, which has been modified, to an empty page in the first log block,*

*wherein at least one of the steps (b) and (d) comprises writing the predetermined data to an empty page of the first log block, and*

*wherein the predetermined data is written to an empty page at the same position as the requested page in the first data block.*

*19. A method for writing predetermined data to a flash memory comprising a plurality of data blocks and a plurality of log blocks, the method comprising:*

*(a) receiving a request to write the predetermined data to a page of a first data block, among the data blocks, to which data has been written;*

*(b) writing the predetermined data to a first log block, among the log blocks, corresponding to the first data block containing the page;*

*(c) receiving a request to write the predetermined data which has been modified, to the page again; and*

*(d) writing the predetermined data, which has been modified, to an empty page in the first log block,*

*wherein the log block, in at least one of the steps (b) and (d), is obtained by allocating a free block as the first log block, and wherein the first log block in the writing step (d) can be the same log block used in the step (b) or a newly allocated log block, and*

*wherein the allocating the free block comprises:*

*performing a block merge of a pre-existing data block and a pre-existing log block, corresponding to the pre-existing data block, to create a new data block;*

*performing an erase operation of the pre-existing data block; and*

*allocating the erased, pre-existing block as the free block.*

*20. The method of claim 19, wherein the block merge is performed when a free block to be allocated as the first log block does not exist or when all pages of a pre-existing log block corresponding to the first data block have been used.*

*21. The method of claim 19, wherein the block merge is a switch merge comprising:*

*changing the pre-existing log block to a new data block, when pages of the pre-existing log block are arranged in the same order as and correspond one-to-one with pages of the preexisting data block.*

*22. The method of claim 21, wherein the pre-existing log block is the first log block and the pre-existing data block is the first data block.*

*23. The method of claim 19, wherein the block merge is a copy merge comprising:*

*copying corresponding pages of the pre-existing data block to empty pages in the corresponding pre-existing log block to create the new data block, when the pages in the pre-existing log block are requested to be written only once.*

*24. The method of claim 23, wherein the pre-existing data block is the first data block and the pre-existing log block is the first log block.*

*25. The method of claim 19, wherein the block merge is a simple merge comprising:*

*copying the latest pages in the pre-existing log block to empty pages of a free block, to which data has not been written, and copying corresponding pages of the pre-existing data block to the remaining empty pages thereof thereby creating the new data block.*

*26. The method of claim 25, wherein the performing an erase operation step is performed on either the pre-existing log block or the pre-existing data block, and wherein the allocating the free block step is performed all either the pre-existing log block or the pre-existing data block.*

*27. The method of claim 25, wherein the pre-existing data block is the first data block and the pre-existing log block is the first log block.*

* * * * *